Jan. 15, 1946.    R. E. BOYDEN    2,393,018
AUTOMATIC COUNTER REVERSE MECHANISM
Filed July 29, 1942    7 Sheets-Sheet 1

FIG_1_

INVENTOR
Robert E. Boyden
BY
ATTORNEYS

Jan. 15, 1946. R. E. BOYDEN 2,393,018
AUTOMATIC COUNTER REVERSE MECHANISM
Filed July 29, 1942 7 Sheets-Sheet 2
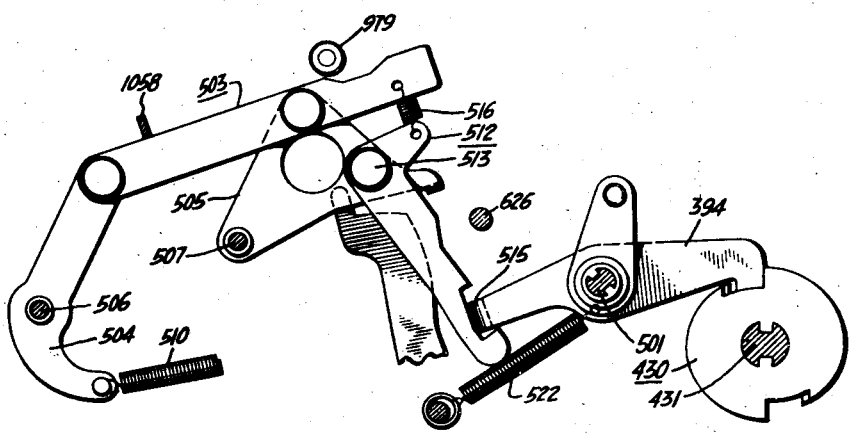
FIG. 2.
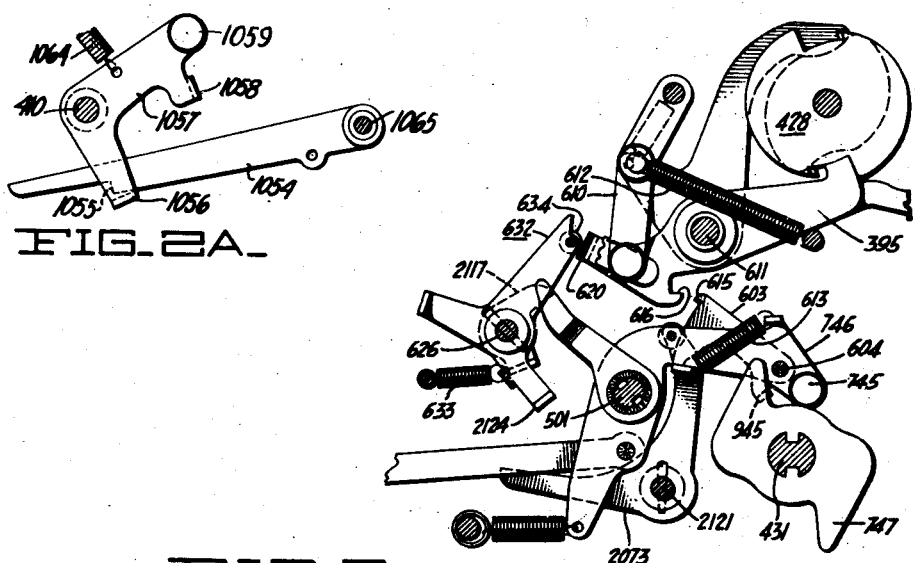
FIG. 2A.
FIG. 3.
INVENTOR
ROBERT E. BOYDEN
BY
ATTORNEYS Jan. 15, 1946.  R. E. BOYDEN  2,393,018
AUTOMATIC COUNTER REVERSE MECHANISM
Filed July 29, 1942   7 Sheets-Sheet 3

INVENTOR
ROBERT E. BOYDEN
BY
ATTORNEYS

Jan. 15, 1946.   R. E. BOYDEN   2,393,018
AUTOMATIC COUNTER REVERSE MECHANISM
Filed July 29, 1942   7 Sheets-Sheet 4
FIG. 6.
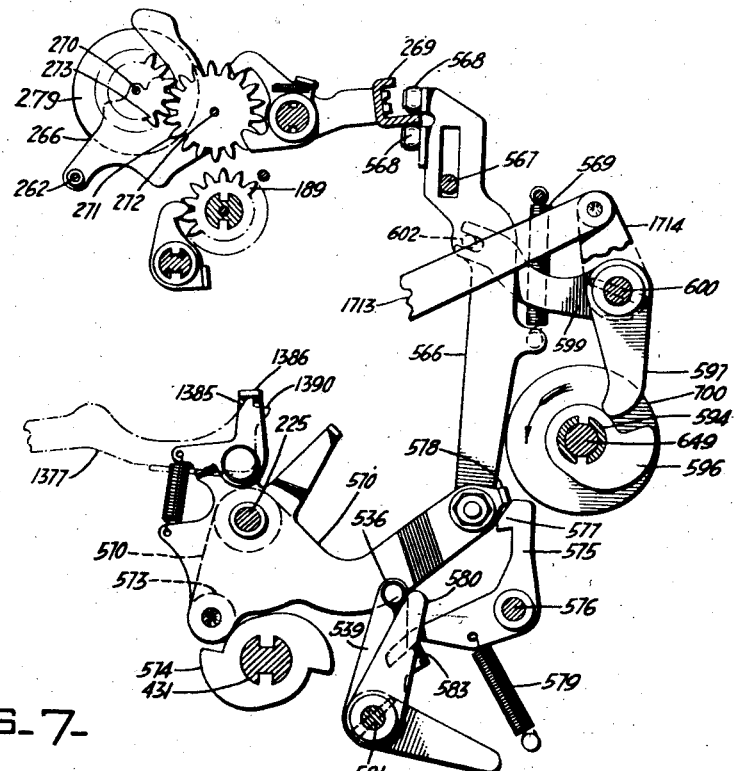
FIG. 7.
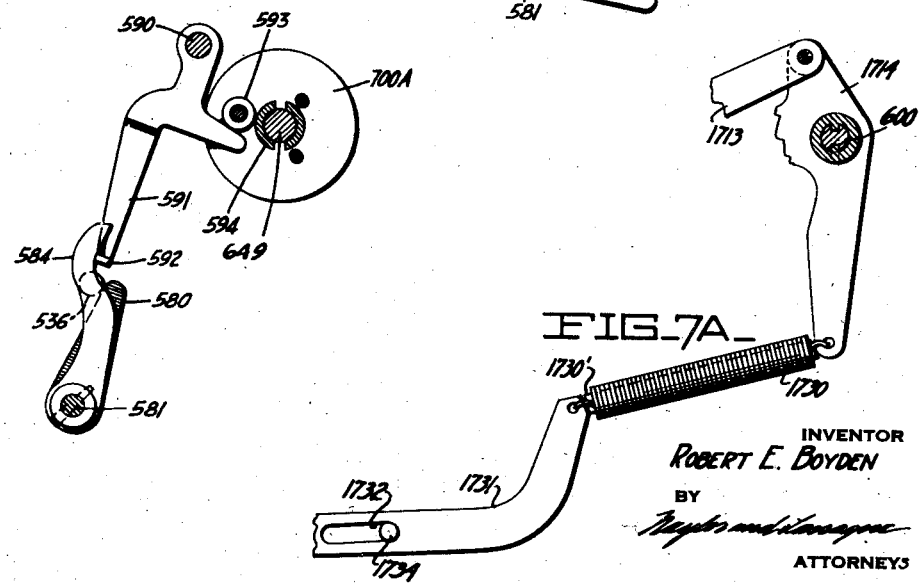
FIG. 7A.
INVENTOR
ROBERT E. BOYDEN
BY
ATTORNEYS Jan. 15, 1946.  R. E. BOYDEN  2,393,018
AUTOMATIC COUNTER REVERSE MECHANISM
Filed July 29, 1942   7 Sheets-Sheet 5

INVENTOR
ROBERT E. BOYDEN
BY
ATTORNEYS

Jan. 15, 1946. R. E. BOYDEN 2,393,018
AUTOMATIC COUNTER REVERSE MECHANISM
Filed July 29, 1942 7 Sheets-Sheet 6
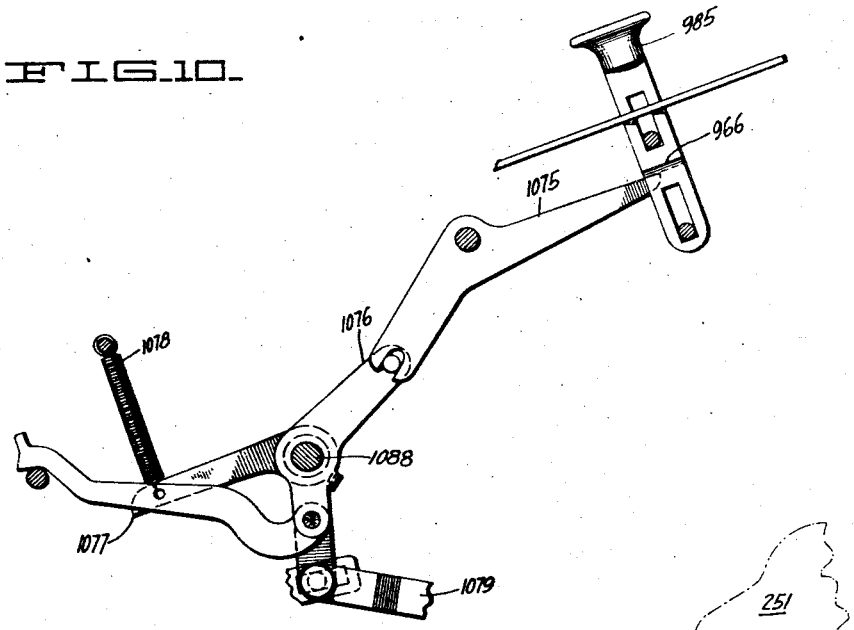
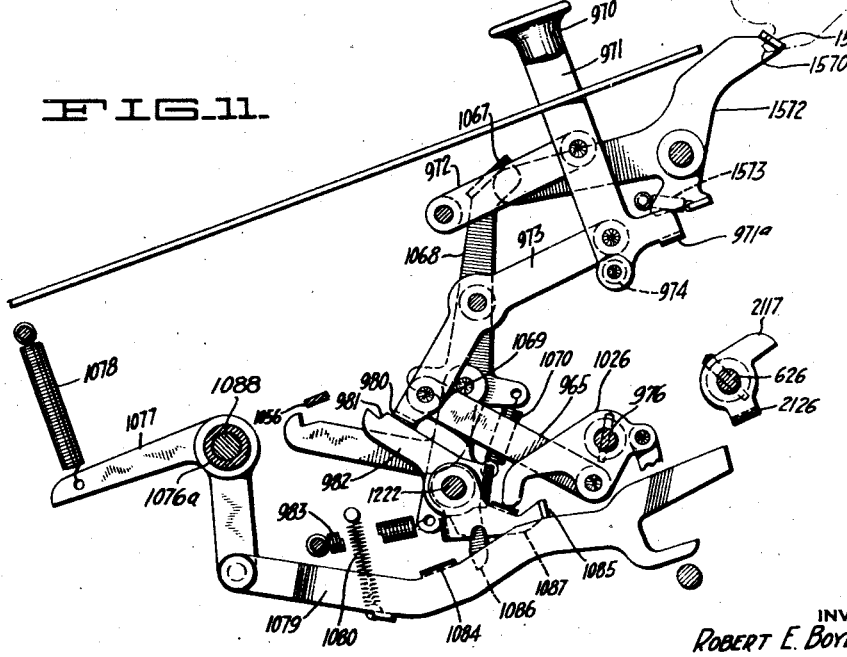
INVENTOR
ROBERT E. BOYDEN
BY
ATTORNEYS Jan. 15, 1946. R. E. BOYDEN 2,393,018
AUTOMATIC COUNTER REVERSE MECHANISM
Filed July 29, 1942 7 Sheets-Sheet 7
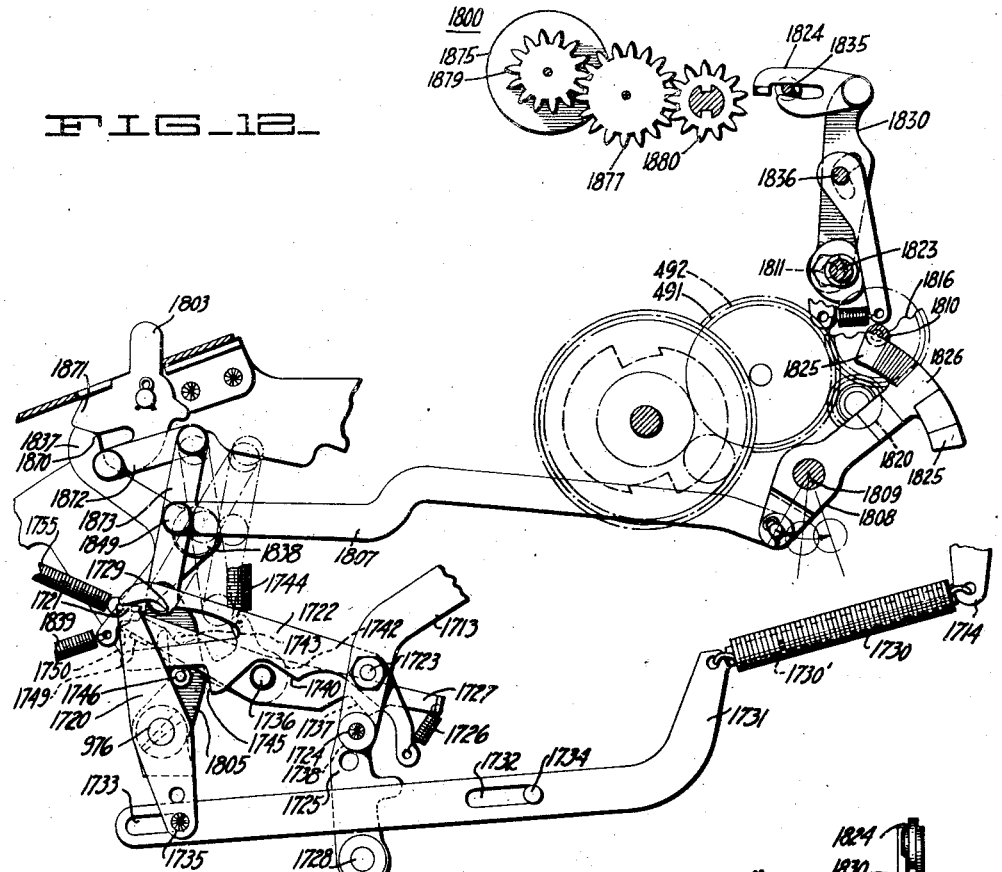
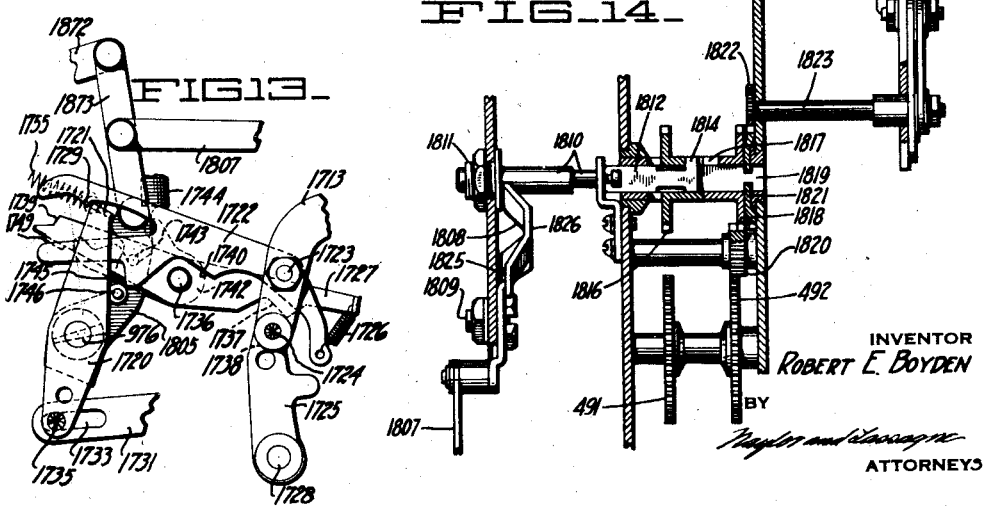
INVENTOR
ROBERT E. BOYDEN
BY
ATTORNEYS Patented Jan. 15, 1946

2,393,018

UNITED STATES PATENT OFFICE 2,393,018

AUTOMATIC COUNTER REVERSE MECHANISM

Robert E. Boyden, Los Angeles, Calif., assignor to Marchant Calculating Machine Company, a corporation of California Application July 29, 1942, Serial No. 452,679

8 Claims. (Cl. 235—79)

The present invention relates to calculating machines and the like having registering means to display factors and results of calculations, and has particular reference to a machine of this class capable of performing the four cardinal calculations, and wherein the registering means may be caused to display the result of a calculation, either as a true figure or as a complement of that figure.

It is well known that in order to obtain a true figure registration of the multiplier in a multiplication operation it is necessary that the dials of the quotient and multiplier register, commonly called the "counter dials," be driven in the same direction as the accumulator dials are driven, while to obtain a true figure registration of a quotient in a division operation it is necessary that the counter dials be driven in the opposite direction to that in which the accumulator dials are driven. On the other hand in order to obtain a complementary registration of a multiplier in multiplication operation, the counter dials must be driven in a direction opposite to that in which the accumulator dials are driven, while to obtain a complementary registration of a quotient in a division operation the counter dials must be driven in the same direction as the accumulator dials are driven.

Automatic control devices for insuring that the counter dials will be driven in the proper direction with respect to the accumulator dials in any selected class of calculation have previously been provided. In general, such devices are effective to set the counter reversing mechanism as an incident to the initiation of each calculation and to restore it to its initial setting at the conclusion of each calculation. This requires that such devices include both a counter reverse setting means and a counter reverse restoring means, rendering them complex in construction and also resulting in many useless operations of the setting means, the restoring means, and the counter reversing means, by reason of the fact that restoring and setting occur unnecessarily whenever calculations of the same class are performed in sequence.

It is the principal object of the present invention to simplify automatic control devices of this character by completely eliminating all restoring functions therefrom and adapting such devices to merely control the operation of an independently actuated restoring device.

It is a further object of the invention generally to improve and simplify automatic control devices of the class described.

The manner in which the foregoing together with additional objects and advantages of the invention are accomplished will be best understood from the following description of a preferred embodiment thereof when read in conjunction with the accompanying drawings, in which:

Figure 2 is a side view illustrating the setting clutch and controls therefor;

Figure 2A is a detail side view of the device operable during certain phases of division operations for causing engagement of the setting clutch;

Figure 3 is a side view of the main clutch and controls therefor;

Figures 6 and 7 are side views illustrating the mechanism for dipping and latching the accumulator register with its driving gears meshing with the actuator gears;

Figure 7A is a detail side view of part of the division key returning mechanism;

Figure 10 is a side view illustrating part of the stop key mechanism;

Figure 11 is a side view illustrating part of the stop key mechanism and the division control mechanism;

Figure 12 is a side view illustrating the counter, the actuator therefor, and the control means for the counter actuator constructed in accordance with the present invention;

Figure 13 is a detail side view similar to Figure 12 illustrating certain of the elements in an alternate position;

Figure 14 is an end view, partly in section, illustrating the drive train and the control train for the counter actuator, including the reversing unit.

General construction

Figure 1:
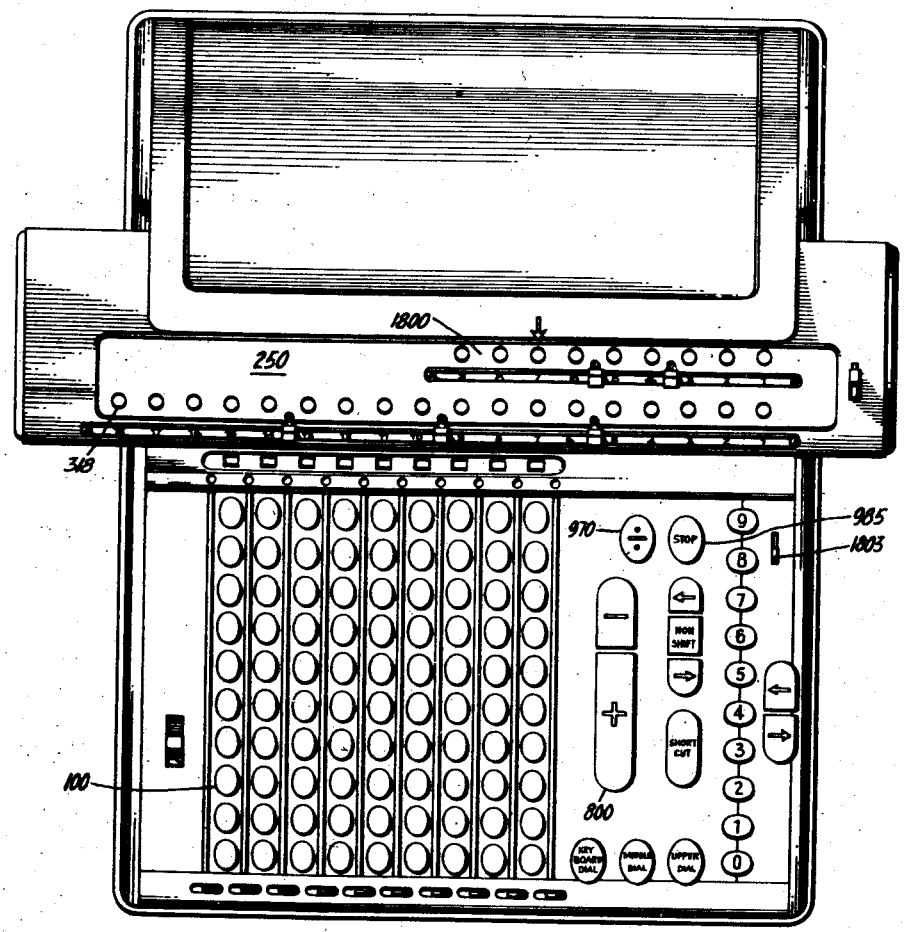
Figure 1 is a plan view of the calculating machine embodying the present invention.

Since the machine in which the present invention is embodied in its preferred form is disclosed in detail in the Avery Patent 2,216,659, to which reference may be made for a full disclosure of the machine as a whole, only a brief description of the operation of the same will be included herein; it being noted that parts shown but not described herein may be found described in said patent, with identical reference numerals applied thereto.

The machine is of the proportional gear, selective speed, type wherein there is provided a series of gear combinations (not shown) of different gear ratios in each order. The usual banks of keys 100 (Figure 1) are provided, one for each order, to control the connection of one of the gear combinations, depending on the value of a key depressed, to a cyclically operable actuator including a main clutch 428 (Figure 3) and thereby transmit rotation to a series of ordinally positioned drive gears 189 (Figure 6). During actuation, intermeshing gears 271 and 273 supported on pivot rods 272 and 278, respectively, carried by the carriage 250 and aligned with the various ordinal gears 189, are entrained with these gears to transmit rotation to accumulator dials 279 forming an accumulator register 318 (see Figure 1). As disclosed in the above mentioned Avery Patent 2,216,659, tens carry mechanism (not shown) of the duplexing type is provided to effect tens transfer.

The ratios of the various above mentioned gear combinations are such that for each cycle of operation of the actuator, the dials 279 will each be driven at a rate of speed proportionate to the value of the depressed key 100 in line therewith, plus an added increment of one-tenth of the amount of rotation of the next lower order dial. Thus, during each cycle of operation of the main clutch 428 an amount corresponding to the amount set up in the keyboard will be entered into the accumulator register 318 and, through mechanism to be disclosed hereinafter, the number of cycles of operation of the main clutch in each carriage position will be entered into appropriate dials 1875 (Figure 12) of a counter register 1800 (see Figure 1) so that during division the counter register 1800 serves to register the quotient of a problem, while during multiplication the register 1800 registers the multiplier and during addition this register registers the number of additions performed.

Setting clutch control

Engagement of the main clutch is effected by a setting clutch 430 (Figure 2) keyed on a setting shaft 431 and adapted to be driven by the machine motor (not shown), when engaged. The setting clutch 430 is engaged through the instrumentality of any of a series of operation control keys such as the division key 970, and the add bar 800 (Figure 1), and when so engaged effects certain preliminary operations incident to the commencement of a calculation under power of the machine motor besides causing engagement of the main clutch to effect actuation.

The setting clutch is normally held disengaged by a clutch dog 394 (Figure 2) which is keyed on a rockable shaft 501 and is urged clockwise by a spring 522 tensioned between the machine frame and the dog so as to urge its rightmost end, as viewed in Figure 2, into its illustrated position wherein it seats in one of a pair of diametrically opposed notches formed in the clutch 430 and holds the clutch disengaged from the motor drive.

To permit operation of the setting clutch by any one of several operation control mechanisms, a depressible operating bar 503 is provided which is supported by a parallel link arrangement comprising a lever 504 pivoted to the machine frame at 506 and a plate 505 pivoted to the frame at 507. A spring 510 tensioned between the machine framework and the lever 504 normally maintains the bar in its illustrated raised position. A bell crank 512 pivoted to the plate 505 at 513 is normally held by means of a tension spring 516, extending between the bell crank 512 and the bar 503, in a position wherein a notch formed on the lower end thereof embraces an ear 515 on the clutch dog 394 so that upon depression of the bar 503 the bell crank 512 will rock the dog 394 out of the engaged notch of the setting clutch 430 causing the clutch to rotate the setting shaft 431.

Figure 5:
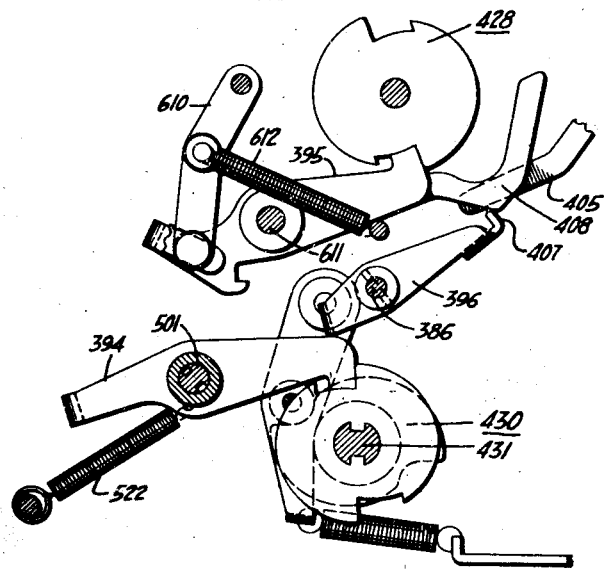
Figure 5 is a side view of the motor circuit control associated with the main clutch and the setting clutch.

Mechanism (not shown) is provided to release the crank 512 from the ear 515 during the first cycle of operation of the setting clutch so as to limit this clutch to a single cycle of operation regardless of how long the bar 503 is held depressed, and means (also not shown) are provided for closing the motor circuit upon rocking of the clutch dog 394. This means is actuated by a shaft 386 (Figure 5) having a lever 396 secured thereto and overlying the clutch dog 394 so as to be rocked thereby.

Main clutch control

The main clutch 428 (Figure 3) is normally held disengaged by a clutch dog 395 pivoted on a shaft 611 and urged into contact with one of a plurality of diametrically opposed notches in the clutch by a spring 612 tensioned between the machine frame and a toggle linkage 610 connected to the clutch dog 395.

To effect engagement of the main clutch under control of the setting clutch a cam 747 is keyed on the setting shaft 431 and engages a cam follower roller 745 mounted on a lever 746 pivoted on a shaft 501 and spring urged into engagement with the cam. An interponent 603 is pivotally mounted at 604 on the lever 746 and is normally held in the position illustrated in Figure 3 by a tension spring 613 extending between ears formed on the interponent and the lever 746, respectively. The interponent 603 has a tip 615 which is adapted to engage a notch 616 on the main clutch dog 395 and thereby, when the shaft 431 is rotated, rock the dog 395 out from whichever notch in the main clutch 428 it was seated and thereby cause the main clutch to transmit rotation from the motor drive to the actuator mechanism including the gears 189 (Figure 6).

To provide for continued multicyclic operation of the main clutch in certain calculations, as for example division, a latch 632 (Figure 3) is provided which is pinned to a rockable shaft 628 and urged clockwise by spring 633 into engagement with an ear 620 on the clutch dog 395. When the clutch dog 395 is rocked clockwise in division and other calculation operations a roller 634 mounted on the upper end of the latch 632 moves into latching engagement with the under edge of ear 620 and thereby holds the main clutch dog 395 from moving into engagement with the main clutch 428.

The main clutch dog 395 also maintains the motor circuit completed during operation of the main clutch 428. Upon rocking of the dog 395 to effect engagement of the main clutch an extension 408 thereon (Figure 5) engages an ear 407 on the aforementioned lever 396 to rock this lever clockwise and thereby close the motor circuit.

Dipping of accumulator register

Upon rotation of the setting shaft 431 and in advance of actuation by the main clutch 428, the various accumulator drive gears 271 (Figure 6) carried by the shiftable carriage 250 (Figure 1) are enmeshed with the aligned actuator drive gears 189, described hereinbefore, this being accomplished by cams, one of which is shown at 574, keyed on the setting shaft 431.

The various sets of gears 271 and 273, as well as other elements (not shown) of the accumulator register, are carried on a series of plates 266 all pivoted by means of a rod 262 to the main body of the carriage and all are connected at their rightmost ends, as viewed in Figure 6, to a common bail 269.

The means for raising and lowering the bail 269 to effect engagement and disengagement of the various gears 271 and 189 comprises a pair of links, one of which is shown at 566, slidable over pins 567 on spaced frame plates of the machine. Each link is provided with rollers 568 engaging the bail 269 on opposite sides thereof and is urged upwardly by a spring 569 tensioned between the links and a pin on the machine frame. The links 566 are pivoted to cam follower levers 570 rockable on a shaft 225, the levers 570 having rollers 573 engaging the cams 574 so that upon rotation of the shaft 431, the followers 570 and links 566 are moved to positively pull down the bail 269 against the action of the springs 569.

Means are provided to latch the accumulator register in its lower position during actuation. This means includes latch levers 575 pivoted at 576 to the machine frame and urged by springs 579 into latching engagement with ears 578 on the cam follower levers 570. When the various plates 266 and the mechanism carried thereby are dipped the ears 578 ride over the noses 577 of the latch levers 575 and are latched therebeneath, thus retaining the gears 271 in mesh with the actuator gears 189 until termination of operation of the main clutch at which time the latches 575 will be released as will be described presently.

Referring to Figures 6 and 7, the means for releasing the latches 575 comprises levers 539 pinned on a rockable shaft coaxial with a shaft 581. On one of the levers 539 is a stud 536 engaged by an arm 580 pinned to shaft 581. Also pinned to shaft 581 is an arm 584 engaged by an ear 592 on an arm 591 pivotally supported on a shaft 590 and provided with an extension adapted to be engaged by a roller 593 carried by a supporting disc 700A which is fixed to a sleeve 594 rotatably mounted on a shaft 649. This sleeve 594 is driven by a separate clutch which is operated as an incident to termination of main clutch operations and is known as the "restore clutch."

Restore clutch

When the main clutch dog 395 is moved to stop and disengage the main clutch 428 (Figures 4 and 5), the restore clutch 700 (Figures 4 and 6), to be described hereinafter, starts operating and rotates the disc 700A (Figure 7). Movement of the roller 593 rocks the lever 591 clockwise to rock the lever 584 and so rock lever 580, which engages the pin 536 on the juxtaposed lever 539. Lateral extensions 583 on the levers 539 engage and rock tails formed on the latches 575 releasing the ears 578 and allowing the spring 569 to return the accumulator register mechanism to an upper position.

The sleeve 594 of the restore clutch 700 carries a cam 596 (Figure 6) which is employed to prevent the carriage from rising too rapidly under the action of the springs 569 whenever the latches 575 are released. The cam 596 is engaged by a cam follower lever 597 fixed to a rockable shaft 600. A pair of arms 599 also fixed to the shaft 600 are joined by pin and slot connections 602 to the links 566 so that the rate of rise of the accumulator register under the pull of springs 569 is no greater than that permitted by rotation of the cam 596.

The restore clutch 700 (Figures 4 and 6), besides effecting release of the carriage latch levers 575 and controlling the rate of return of the bail 269 and parts of the accumulator register to their upper positions also conditions certain of the division control mechanism, as will appear hereinafter, under the section entitled "Division control." The restore clutch is jointly controlled by the accumulator register dipping mechanism and by the main clutch dog in such a way that whenever the accumulator register is in its lower position and the main clutch dog 395 is seated in a notch of the main clutch, the restore clutch will engage and complete one cycle of operation.

The restore clutch is similar in internal construction to that disclosed in the patent to Friden Number 1,643,710, issued September 27, 1927, and is directly controlled by an extending nose 702 (Figure 4) on a clutch release dog in the form of a bell crank 405 which is freely supported on the shaft 600. An M-shaped lever 703 is provided to control the clutch release dog 405 and has one foot thereof pivotally mounted in the shaft 600. A short arm 704 extending from the lever 703 is provided with a tenon on which is positioned a compression spring 705 extending between the arm 704 and a tenon on the left arm of the clutch release dog 405.

An arm 722 keyed to the shaft 600, and thus rocked counter-clockwise by dipping movement of the accumulator, is connected to the M-shaped lever 703 by a combined compression-expansion link unit 723, as disclosed in detail in the above mentioned Avery Patent 2,216,659. The link unit 723 is composed of a pair of links 715 and 716, the former pivoted at one end thereof on a stud mounted on the arm 722 and the latter link 716 pivoted at one end thereof on a stud extending from the lever 703. The two links slide relative to each other and have elongated slots at the free ends thereof each slidable over the pivotal stud for the other link. A compression spring 714 is inserted in a pair of coextensive apertures formed in the two links, being positioned over opposed tenons extending from each link, and thereby opposes any attempt to lengthen or shorten the link unit beyond its normal length illustrated in Figure 4.

Now, at the start of a calculation, and as the setting clutch is rotated, the main clutch dog 395 is withdrawn from contact with the main clutch and an extension 408 of the dog 395 is withdrawn from beneath an ear 710 on a latch lever 701 pivoted to the machine frame and urged counter-clockwise by a spring 717 tensioned between the latch lever and the machine frame. The latch 701 is therefore rocked counter-clockwise and an ear 718 thereon is rocked into a notch 719 formed in the M-shaped member 703 to prevent counter-clockwise movement of lever 703 until the main clutch has been disengaged by reseating of its dog 395 in one of the full cycle notches of the clutch 428. The lowering of the accumulator register mechanism (Figure 6), however, tends to engage the restore clutch even before the main clutch engages and a second restraining means is provided to prevent this operation.

The left foot of the lever 703 is provided with a shelf 720 overlying one end of a bell crank 721, pivoted on the shaft 611, and having a roller 707 at the other end thereof in engagement with a cam 708 keyed on the setting shaft 431. On rotation of the setting clutch, therefore, the bell crank 721 is rocked to raise the lever 703 and thus insure that the ear 718 of the latch member 701 will be able to engage the notch 719 properly when the main clutch is engaged. As the setting clutch continues through a single cycle of operation the cams 574 (Figure 6) effect dipping of the accumulator register mechanism and, consequently, the shaft 600 is rocked counter-clockwise. Therefore, the arm 722 (Figure 4) keyed to the shaft 600 is lowered and the link unit 723 is lengthened against the opposition of its spring 714. The parts remain so positioned with the spring 714 compressed until the main clutch dog 395 is permitted to reseat in a notch of the clutch 428 whereupon the extension 408 thereon strikes the ear 718 of the latch lever 701, rocking it clockwise and removing its lug 718 from the notch 719 of the lever 703. Spring 714 then expands shortening the link unit 723 and rocking the member 703 counter-clockwise to carry the left leg (Figure 4) of lever 703 down against the leftwardly extending arm of the bell crank 405 to rock this lever counter-clockwise and remove the nose 702 thereon from engagement with the restore clutch 700, thereby enabling the clutch to become engaged.

Figure 4:
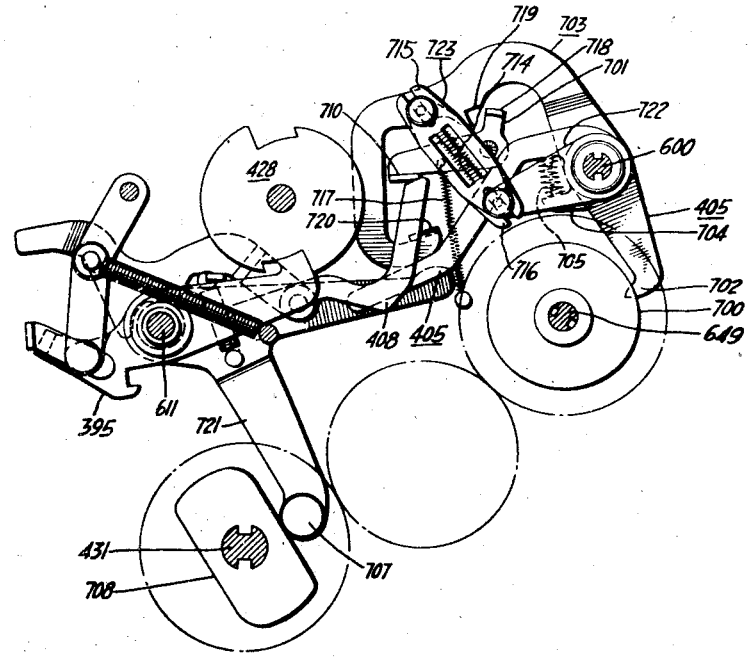
Figure 4 is a side view of the restore clutch and controls therefor.

Operation of the restore clutch, thus initiated, causes the latches 575 (Figure 6) to be released in the manner described in connection with Figures 6 and 7 and controls the rate of rise of the links 566 through the cam 596, as previously described, enabling the springs 569 to rock the shaft 600 and arm 722 (Figure 4). This movement of arm 722 tends to compress the spring 714 which, being stronger than the spring 705, transmits a rocking movement to the link 723 and lever 703 to compress the spring 705 until the nose 702 of the restore clutch dog 405 can re-enter into an aperture of the housing of the restore clutch 700, whereupon the restore clutch becomes disengaged and the mechanisms are brought to rest in the position illustrated in Figure 4.

The restore clutch dog 405, when moved counter-clockwise to effect engagement of the restore clutch 700, causes the motor circuit to be closed. This is accomplished by the leftwardly extending arm of the dog 405 (see Figures 4 and 5) which engages the ear 407 on the lever 396 and rocks the shaft 386 clockwise to close the circuit of the motor.

*Division control*

Figure 9:
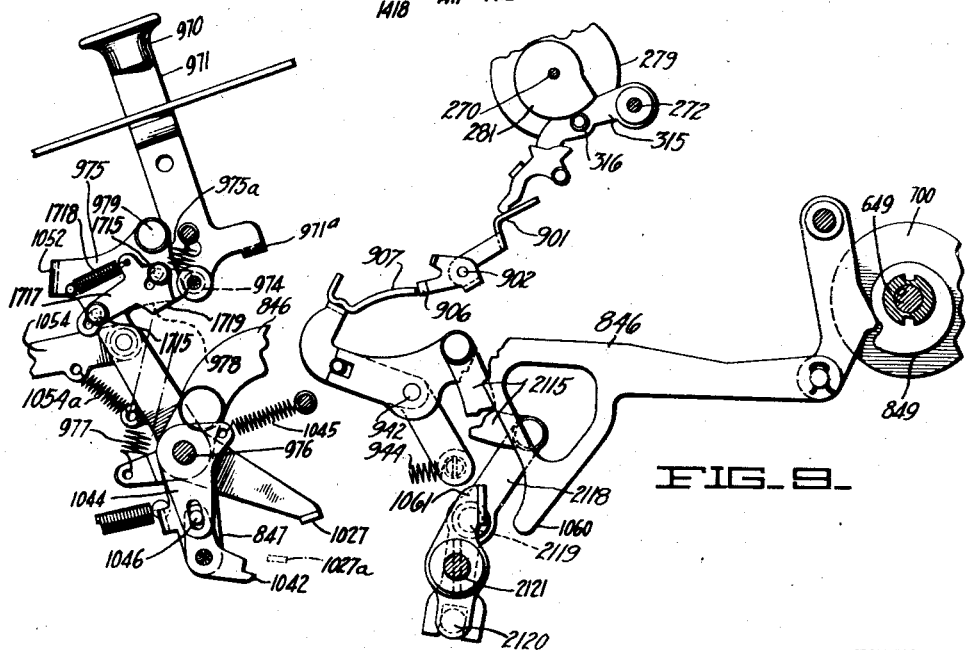
Figure 9 is a side view illustrating the control of the division control member by the division initiating key, the relationship between the division control member and the restore clutch mechanism, and the means controlled by the accumulator register for tripping the main clutch dog latch.

As disclosed in detail in the above mentioned Avery Patent 2,216,659, division is performed by setting up the dividend in the accumulator register 318, as by the usual adding operation, and then setting up the divisor in the keyboard, and depressing the division initiating key 970 (Figures 1, 9 and 11). The machine thereupon carries out automatically the operation of dividing the divisor into the dividend and registering the quotient in the counter register 1800 carried by the shiftable carriage 250. The operation consists of successive subtractions of the divisor from those digits of the dividend which are registered in orders of the carriage aligned with the portion of the selecting mechanism containing the divisor, and which may be called the "effective dividend." The machine continues to subtract until the remainder in the "effective dividend" portion of the accumulator is reduced to a value substantially less than half the divisor whereupon the division control mechanism is automatically tripped for stopping the subtraction. Since the machine is arranged to stop actuation only in full cycle position it proceeds through whatever fraction of a cycle may be necessary, after trip-off, in order to complete the particular cycle of negative actuation then in process, which causes the machine to subtract a corresponding fraction of the divisor (which fraction may be any amount up to the whole divisor) from the amount of the dividend remainder at the time of trip-off. Since that amount was at the time of trip-off substantially less than the divisor, the remainder at the end of this negative cycle may be either more or less than zero depending on whether the trip-off occurred early or late in the cycle of subtraction. If the remainder is less than zero the machine will, of course, be in an overdrafted condition. Means are provided to sense the condition of the machine at this time and if it is in an overdrafted condition the sensing means will automatically cause a subsequent plus actuation cycle to be instituted to correct the overdrafted condition after which the carriage is automatically shifted one step to the left. However, if the remainder has not been reduced to less than zero at the end of the cycle the sensing mechanism will not effect the "corrective" plus actuation cycle but the carriage will, nevertheless, be shifted one step to the left.

As the carriage is automatically shifted to the left, additional dividend digits in the accumulator register are successively brought into alignment with the part of the actuator mechanism controlled by the portion of the keyboard upon which the divisor is set until the carriage reaches its leftmost position. Since the construction and operation of the division control mechanism is described in detail in the above Avery Patent Number 2,216,659, only a brief description of the mechanism will be given herein.

The division initiating key 970 (Figure 11) is mounted on a key stem 971 supported by a pair of parallel levers 972 and 973 pivotally mounted on the machine frame. A roller 974 on the bottom end of the key stem 971 normally lies in front of a division control member 975 (see Figure 9). The member 975 is pivotally mounted on a shaft 976 and is urged clockwise by a strong spring 977 tensioned between an arm formed on the member 975 and a pin on the machine frame, thus holding the key 970 in its upper illustrated position by virtue of the friction created by the engagement of the slightly arcuate rear face 975a of member 975 with the roller 974.

When the division key is depressed, the roller 974 passes beneath the rightward portion (Figure 9) of the under surface 978 on the control member 975 allowing the spring 977 to rock the member 975 clockwise whereupon a roller 979 at the top of the member 975 strikes the upper edge of the main operating bar 503 (Figure 2) and depresses the bar to effect engagement of the setting clutch 430.

The division key 970 is held in depressed position by a latch 982 (Figure 11) pivotally mounted on a shaft 1222 and provided with a notch 981 which when the key 970 is depressed is moved into latching engagement with an ear 980 of lever 973 by a spring 983 tensioned between an arm of the latch 982 and a pin on the frame.

Means are also provided for insuring that if the division key 970 is depressed sufficiently to release the member 975 (Figure 9) it will automatically be depressed a sufficient additional distance to permit notch 981 (Figure 11) to engage ear 980 even though finger pressure is removed from the key as soon as member 975 is released. For this purpose member 975 (Figures 8 and 9) carries a member 1717 provided with an edge 1719 engageable with roller 974 which edge extends along a line disposed at an obtuse angle with respect to a radius extending from shaft 976 as a center and therefore acts, during clockwise movement of member 975, as a cam engaging roller 974 to effect additional downward movement of key 970.

During the operation of the machine, as appears hereinafter, latch 982 is released from ear 980 before member 975 has been completely restored to its normal position in which it is shown in Figure 9, and in order to prevent member 1717 from holding key 970 depressed so far as to permit re-engagement of latch 982 with ear 980 after such release, the leftmost end of edge 1719 of member 1717 is spaced from the member 975 sufficiently to permit roller 974 to move upwardly upon release of latch 982 far enough to prevent reengagement of the notch 981 with ear 980. Also, the member 1717 is movably mounted on member 975 by means comprising pins 1715 on member 975 extending through arcuate slots 1716 in member 1717, so that during counterclockwise movement of member 975 member 1717 will not cam the roller 974 downwardly but will be moved rightwardly and upwardly with respect to member 975 by said roller overcoming spring 1718 which normally holds member 1717 in the position shown, and roller 974 will be guided by the arcuate lower edge 978 of member 975, which edge conforms to an arc described upon a uniform radius about shaft 976.

The first setting clutch cycle initiated by depression of the division key will cause retraction of the main clutch dog 395 (Figure 3) and the spring 633 (Figure 3) will become active to hold the latch 632 in latching engagement with the main clutch dog 395 whereupon multicyclic operation of the main clutch ensues. The actuator mechanism, including the gears 189 (Figure 6) are conditioned to operate in a subtractive direction, as described in the aforesaid Avery patent, by the depression of the division key 970 so that the divisor set up on the keyboard will be subtracted one or more times from the dividend appearing in the accumulator register.

Sensing mechanism is continuously effective throughout the series of subtractive operations effected in each shifted position of the carriage to compare the continuously changing remainder with the divisor and to operate the automatic controls for terminating the subtractive operations when that remainder becomes substantially less than the divisor. This same sensing mechanism is subsequently employed in each carriage position to ascertain whether or not an overdraft has occurred. The sensing mechanism comprises a sensing lever 901 under control of each order of the keyboard (plus two additional levers located one and two orders to the left, respectively) each of which levers is arranged to cooperate with related mechanism positioned by the corresponding accumulator dial, but only the sensing lever controlled by the key board order which contains the highest significant digit of the divisor, and all sensing levers to the left thereof are permitted to come into operation. Means (not shown) is provided to hold the various sensing levers to the right of the said sensing lever out of controlling position. The orders in which the sensing levers are thus permitted to come into operation will be referred to as the "controlling orders."

As more fully described in the aforesaid Avery patent, during rotation of the active accumulator register dials 279 (Figure 9) a snail cam 281 connected to each of the dials will be rotated in a clockwise direction, and cam follower 315 pivoted on rod 272 and following its respective cam 281 by means of a roller 316 will depress a shelf formed on sensing lever 901 pivotally supported at 902, thus rocking the lever 901 clockwise. A foot 906 on one or more of the levers 901 is normally engaged during division by a division trol bail 907 pivoted at 942 to the machine frame and urged clockwise by a spring 944 tensioned between the machine frame and an arm on the bail 907. A link 2115 is connected between an arm on the bail 907 and a lever 2118 pivoted at 2119 to the machine frame. The lever 2118 is connected through a pin and slot connection to an arm 2120 pinned on a shaft 2121.

Referring to Figure 3, a bell crank 2073, also pinned on the shaft 2121, has a leftwardly extending arm underlying an ear 2124 of the main clutch dog latch 632, so as to engage and rock the latch 632 out from under the ear 620 of main clutch dog 395 upon tripping of the bail 907 by the sensing levers 901.

The position of the pivot 902 (Figure 9) of each of the controlling sensing levers 901 is controlled by the size of the digits in the controlling keyboard orders containing the divisor, as disclosed in detail in the above mentioned Avery Patent Number 2,216,659. That is, the position of each pivot 902 in the controlling orders is adjusted in a substantially vertical direction by an amount dependent upon the value of the divisor as set in the corresponding keyboard order, this amount being such that when the remainder in the accumulator dials is reduced to approximately one-half of the divisor, the cam 281 in the controlling order of the accumulator will have forced its cam follower 315 and, consequently the corresponding sensing lever 901, to a position wherein the foot 906 on the sensing lever 901 passes above the rightwardly extending finger of the bail 907, permitting the spring 944 to rock the bail 907 clockwise and effect release of the latch 632 (Figure 3) so as to stop the main clutch.

It will be recalled that the main clutch dog 395 (Figures 4 and 5), when rocked home by its spring 612, will trip the latch 701 and allow the now extended link unit 723 to contract and rock the lever 703 and the restore clutch dog 405 counter-clockwise to cause engagement of the restore clutch 700.

Figure 8:
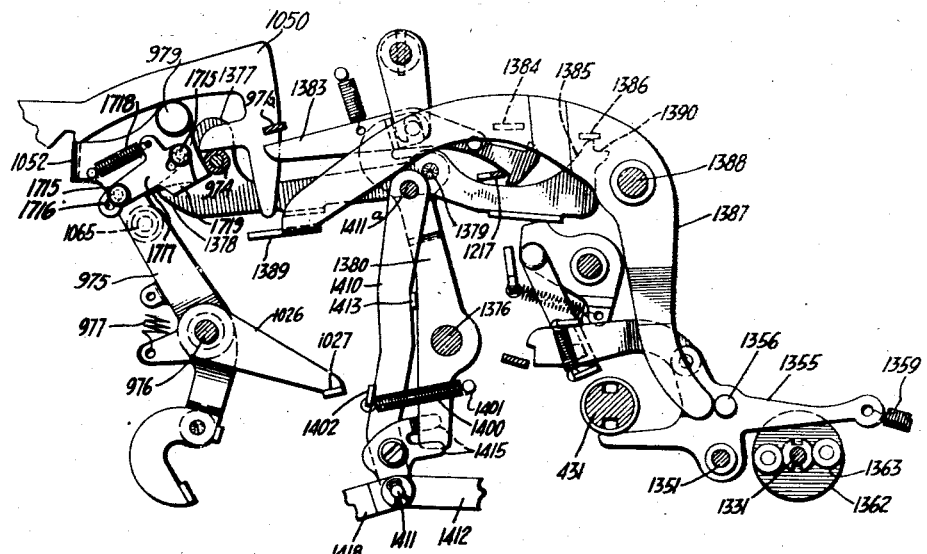
Figure 8 is a side view illustrating part of the division control mechanism, particularly that utilized in connection with control of the carriage shifting means.

During the restore clutch cycle and while the accumulator register is being raised, a link 846 (Figure 9) is moved to the left by a cam 849 driven by the restore clutch 700. A lever 847 pivoted on the shaft 976 and pivotally connected to the link 846 is rocked counter-clockwise. This lever 847 has a notched bell crank 1042 pivotally mounted thereon and adapted to engage an ear 1027 extending from the division control member 975 so as to rock the member slightly further counter-clockwise than is illustrated in Figures 8 and 9 wherein it may be latched by a latch 1050 to be described hereinafter. A second bell crank 1044, freely mounted on the shaft 976, has one end thereof provided with an elongated slot embracing a pin 1046 on the bell crank 1042. A spring 1045 tensioned between the other end of the bell crank 1044 and the frame holds the bell crank 1042 in position to engage the extension 1027 during the first part of the movement of the cam 849, providing the division control member 975 has been rocked clockwise of its illustrated position by spring 977 wherein the ear 1027 is located at 1027a, but causes the bell crank 1042 to be rocked counter-clockwise relative to the lever 847 upon continued movement of the cam 849, if the member 975 is maintained in its illustrated position, so as to underride and miss the ear 1027. Thus, since the member 975 is in its clockwise rocked position during the repeated subtraction of the divisor from the dividend, the bell crank 1042 will engage the extension 1027 and will rock the member 975 counter-clockwise until an ear 1052 thereof is latched by a latchlever 1050 (Figure 8) which is pivoted at the left end thereof (in a manner not shown) to the machine frame and spring pressed downwardly.

The division control member 975 is pivotally connected at 1065 to a link 1054 (Figures 2A, 8 and 9) urged counter-clockwise relative to the member 975 by a tension spring 1054a extending between the link and the member. Link 1054 has a shoulder 1055 adapted to engage an ear 1056 on a bell crank 1057 pivoted on a pin 410 and normally held in its illustrated position by a tension spring 1064 extending between the bell crank and the machine frame. An ear 1058 (see also Figure 2) on the bell crank 1057 overlies the setting clutch operating bar 503.

When the member 975 is first rocked clockwise upon depression of the division key 970, the link 1054 is carried rightward thereby to allow the shoulder 1055 to drop to a position behind the ear 1056 on the bell crank 1057. Now, upon the succeeding restore clutch cycle, the cam 849 (Figure 9) causes the member 975 to be rocked counter-clockwise, as described above. During this rocking of the member 975 the shoulder 1055 of the link 1054 engages the ear 1056 to rock the bell crank 1057 clockwise against the action of the spring 1064, causing the ear 1058 to depress the setting clutch operating bar 503 (Figure 2) and initiate a "corrective cycle" as described in detail in the above mentioned Avery Patent Number 2,216,659, to correct for an overstroke if such has occurred. Means (not shown) are provided to release the link 1054 from engagement with the ear 1056 of the bell crank 1057 during the succeeding setting clutch cycle so as to allow the parts to return to their illustrated position.

Operation of the restore clutch 700 (Figure 9), furthermore, returns the division control bail 907 slightly to the left of the position illustrated in Figure 9 so that it may be relatched by the various blocking tails 906 of the sensing levers if an overdraft has occurred. Since the blocking tails 906 had been raised clear of division control bail 907 in all controlling orders of the machine at the time the bail was released to terminate negative operation (due to the remainder then being substantially less than the divisor), and since the only change in dial registration subsequent to trip-off has been a further subtraction of a fractional part of the divisor, the remainder will now either be still less than it was at time of trip-off (in which case blocking tails 906 will be raised even further clear of bail 907 and the bail will be free to be again rocked clockwise through its complete path of movement by the spring 944 to prevent a subsequent "corrective" plus cycle of actuation, as will be described presently) or an overdraft will have occurred bringing the higher order dials to register "9's" which being greater than the "0" divisor settings effective above the highest order of the divisor will cause the blocking tails 906 to block bail 907.

For the purpose of returning the division control bail 907 counterclockwise, the link 846 is provided with an extension 1060 adapted, on leftward movement of the link, to rock an arm 1061 pinned on the shaft 2121 to which is also pinned the arm 2120 (Figure 9), thereby causing the members 2118 and 2115 to rock the bail 907 counter-clockwise. As positioned at the end of the restore cycle, the cam 849 is so proportioned as to permit the link 846 to be spring returned toward the right, as viewed in Figure 9, and if the bail 907 is not held at this time by any of the locking tails 906 it will be allowed to rock completely through its path of movement under the urge of the spring 944 and thus cause the bell crank 2073 (Figure 3) to engage the lug 945 on the interponent 603 and rock the same downward with respect to the cam follower lever 746 so that, during the succeeding second setting clutch cycle in which the follower 746 is rocked by the cam 747, the member 603 will not engage the main clutch dog 395 and main clutch operation will not occur. If, however, the bail 907 is blocked by a blocking tail 906 the bell crank 2073 will not become effective to rock the member 603 to an ineffective position and a main clutch operation will therefore be instituted, means (not shown) being provided to limit the main clutch operation to one cycle and to insure that the actuator is driven in a plus direction. It will thus be seen that main clutch operation at this time depends on whether or not an overdraft has occurred, for if an overdraft has taken place it is necessary that a corrective main clutch cycle be instituted.

In view of the fact that the reversing device for controlling the direction of operation of the actuator, as well as the controls therefor are disclosed in detail in the above mentioned Avery Patent Number 2,216,659, such is not disclosed herein. However, it should be noted that the reversing device is set to cause the actuator to operate in a subtractive direction upon clockwise rocking of the member 975 at the initiation of the division operation by the roller 979 thereon. During the first restore clutch cycle the member 975 is returned counter-clockwise and the link 1054 (Figure 2A) thereon rocks bell crank 1057 as above described. As the bell crank 1057 rocks to cause engagement of the setting clutch for a possible correction cycle a roller 1069 on the bell crank sets the reversing device to cause the actuator to operate in a positive direction in the event a main clutch cycle is instituted.

If a corrective cycle has been initiated the main clutch dog will arrest the operation of the main clutch after a single cycle of operation and will automatically institute a second restore clutch operation in the usual manner. If, however, such a corrective cycle is not initiated, the second restore clutch operation will be automatically instituted toward the end of the second setting clutch cycle which, it will be recalled, was instituted by recocking of the division control member 975 (Figure 9). Since in the latter circumstances the main clutch dog 395 is not removed from the position in which it is shown in Figure 4, its extension 408 prevents any engagement of the member 701 in the notch 719 of the M-shaped member 703 controlling operation of the restore clutch, and as the accumulator mechanism is dipped to rock the shaft 600 counter-clockwise, engagement of the restore clutch is prevented only by the bell crank 721 which engages the ear 720 on the member 703. As the setting clutch cycle draws to a close, the cam 708 permits the bell crank 721 to recede from the ear 720, permitting the tension link unit 723 to cause engagement of the restore clutch.

The second restore clutch operation controls the raising of the accumulator mechanism, as described hereinbefore, and initiates an automatic carriage shifting operation as will be described presently. During this second restore clutch cycle, the member 975 will have been held substantially in its illustrated position by the latch 1050 (Figure 8) and consequently the extension 1027 thereof will not be engaged by the latch 1042.

It should be noted that the division key 970 (Figure 11) is maintained in a depressed position throughout the division operation by the latch 982 and will, therefore, not interfere with the subsequent clockwise rocking movement of the division control member 975 in the next carriage order unless the carriage has reached its left end position or a special stop key 985 (Figures 1 and 10) has been depressed.

*Carriage shift control in division*

A complete disclosure of the carriage shifting mechanism and controls thereof will be found in the aforementioned Avery patent, but the operation thereof will be briefly outlined herein in connection with the division mechanism.

Shifting of the carriage to the right or to the left is effected under motor power by a train of elements (not shown) including a shaft 1331 (Figure 8) which is rotatable one-half a revolution for each cycle of operation of the carriage shifting mechanism. Control means are provided for causing a leftward shift of the carriage in division and comprises an ear 1384 (Figure 8) which when moved to the left institutes a leftward shift in a manner not shown. This ear is adapted to be engaged by a hook formed on a floating dog 1383 pivoted on a lever 1380 which is pivoted on a shaft 1376. When the division key 970 (Figure 9) is depressed, an ear 971a on the stem 971 thereof engages the leftmost end of the dog 1383 and rocks the same counter-clockwise until it hooks the ear 1384.

A floating shift control lever 1377 is pivoted at 1379 to the lever 1380 and the leftmost end thereof, as viewed in Figure 8, is weighted so that it tends to rock counter-clockwise about its pivot 1379.

At the end of a division operation in a particular carriage position, the floating carriage shift control lever 1377 is moved to the left, as viewed in Figures 6 and 8, to initiate a carriage shift to the left. During the division operation in a certain carriage position an ear 1386 on one of the cam followers 570 is moved to the right of its position illustrated in Figures 6 and 8 by virtue of the dipping movement imparted to the links 566 by the cam followers 570 when rocked by the cams 574 so that the weighted left end of the lever 1377 will rock the lever counter-clockwise until the notch 1390 on the right hand edge thereof embraces the ear 1386. Now, as the final second restore clutch cycle in the current carriage order ensues, enabling the springs 569 to lift the links 566 and rock the cam followers 570 counter-clockwise, the floating lever 1377 is shifted to the left by the ear 1386 and the dog 1383 is likewise shifted to the left through the action of the lever 1380. Since the dog 1383 is at this time hooked over the ear 1384, the same will be moved to the left to institute a leftward shift of the carriage.

It should be understood that the above carriage shifting operation takes place at the end of the final, or second, restore clutch operation in each carriage position following the corrective cycle instead of at the end of the first restore clutch operation. The carriage shift is prevented from taking place at the end of the first restore clutch cycle by reason of the fact that the division control member 975 is allowed to be held in a clockwise position by its spring 977 during the negative cycling of the actuator, in which case a roller mounted on the pivot pin 1065 engages the under surface 1378 of the shift control lever 1377 to hold the same rocked to position the notch 1390 thereof below the path of movement of the ear 1386 until after the restore clutch has operated sufficiently to allow the cam follower lever 570 to be rocked counter-clockwise and thereby move the ear 1386 to substantially its illustrated position wherein it cannot engage the notch 1390 and shift the floating lever 1377. During the final restore clutch cycle following the corrective cycle, however, the division control member 975, being latched in its counter-clockwise rocked position by the latch 1050, is ineffective to prevent initiation of the carriage shift.

During the initial shift cycle one of a pair of rollers 1363 (Figure 8) placed diametrically opposite each other on a disc 1362, which is rotated by the shaft 1331, rocks a lever 1355 pivoted to the frame stud 1351 against the action of a spring 1359, and a pin 1356 on this lever engages and rocks a bell crank 1387 pivoted to the machine frame at 1388. A shelf 1389 extending from the bell crank underlies the latch 1050 and the leftmost end of the lever 1377 so that the lever 1377 will be rocked from engagement with the ear 1386 to limit the shift operation to one step and the division control member 975 will be released by the latch 1050 to initiate the division operation in the new car carriage order.

*Termination of operation in division*

The above repetitive tour of operations is repeated in each successive carriage position until the carriage reaches its leftmost position or the stop key 985 (Figures 1 and 10) is depressed, when further operation of the carriage shifting mechanism is prevented and the machine is brought to a standstill. As the carriage moves into its leftmost position, a projection 1570 (Figure 11)

carried by the right hand carriage plate 251 strikes the under surface of an inclined cam way 1571 formed on a lever 1572 so as to rock the lever counterclockwise against the action of a tension spring 1573 extending between the lever 1572 and the machine frame.

During a division operation, with the carriage in its leftmost position, the division key will be released from the restraint of latch 982 (Figure 11). A leftwardly extending arm of the lever 1572 underlies an ear 1067 on the upper end of a bell crank 1068 pivoted at 1069 to the division key latch 982. When the lever 1572 is rocked counter-clockwise by the carriage, the bell crank 1068 is rocked by a spring 1070, extending between the bell crank and part of the division key latch 982 to hook a leftward extension thereof around the ear 1056 of the bell crank 1057 (Figure 2A). This bell crank, it will be recalled, is rocked by the link 1054, connected to the division control member 975, during the first restore cycle in each order for the purpose of initiating a corrective cycle. If the end of the bell crank 1068 be hooked over the extension 1056 during such rocking, the bell crank 1068 will be pulled to the left during the first restore cycle rocking the latch lever 982 counter-clockwise about its supporting shaft 1222 to release the lateral extension 980 of the lever 973. Now, the division key rises sufficiently to prevent reengagement of the notch 981 of latch 982 with ear 980 of lever 973, but is prevented from moving to raised position, in the specific embodiment herein described, by a supplemental latch hereinafter described.

During the succeeding second setting clutch cycle this supplemental division key latch, which is provided for the primary purpose of performing certain functions related to the counter reverse control and is therefore described in connection therewith in this specification, is released and the division key 970 is returned to raised position bringing its roller 974 in front of member 975 to prevent resumption of subtractive operation. Thus the machine is brought to rest at the conclusion of a restore clutch cycle following the second setting clutch cycle, with or without an intervening corrective addition cycle of the actuator as previously described.

A division operation may be terminated at the conclusion of operation in any carriage position by a single depression of the stop key 985 (Figures 1 and 10) leaving a quotient digit in that order accurately registered, or it may be terminated at once by two successive depressions of the same key which may possibly leave an inaccurate quotient digit in the counter. The stop key 985 is slidably supported upon pins extending from the machine frame and is provided with an offset 966 which overlies a lever 1075 pivoted to the frame and connected by a pin and slot connection with a lever 1076 pivoted on a shaft 1088 and connected by means of a sleeve 1076a (Figure 11) with a bell crank 1077 which is normally urged in a clockwise direction by a tension spring 1078 extending between the bell crank 1077 and the machine frame. Upon depression of the stop key 985 the bell crank 1077 is rocked in a counter-clockwise direction and a link 1079 pivotally connected thereto and normally urged upwardly by a spring 1080, extending between a pin on the machine frame and the link 1079, is moved to the right. The link 1079 carries a shelf 1084 engageable with a tail 1086 of the division key latch 982 and is limited in its upward travel under tension of spring 1080 by an ear 1085 formed on a lever 1087. The lever 1087 is pivoted on the shaft 1222 which carries the divison key latch 982, and has but a limited swinging movement relative to this latch so that for the present purpose it may be considered as an integral part of the latch. Upon depression of the stop key 985 the link 1079 is moved to the right carrying its shelf 1084 against the lower end of the tail 1086 of the division key latch 982. This swings the division key latch 982 counter-clockwise, releasing the division key to rise slightly until held by aforesaid supplemental latch (Figure 12). Thus, the division key will be permitted to rise during the second setting clutch cycle in that order in the same manner as described before.

A second depression of the stop key after the latch 982 has been tripped also moves the link 1079 to the right. It will be recalled, however, that upon the first depression of the stop key the latch 982 was moved in a counter-clockwise direction. Thus, the lever 1087 was swung upwardly and its ear 1085 permitted the link 1079 to rise under the action of its spring 1080. This rise of the link 1079 is sufficient to cause its right hand end to engage an ear 2126 on an extension of a lever 2117 fixed to the shaft 626 upon the second depression of stop key 985.

Referring to Figure 3, it will be recalled that the latch 632 is also fixed to the shaft 626 so that movement of this shaft by the link 1079 will effect release of the main clutch dog 395 and thus immediately arrest operation of the main clutch, and a restore clutch operation will ensue followed by the usual second setting cycle during which time the division key is caused to rise in the same manner as described hereinbefore.

*Control of counter mechanism in division*

The machine of the present invention has a counter register 1800 carried by the carriage (Figures 1 and 12) to serve as a multiplier register in multiplication operations and a quotient register in division operations. The counter actuator is connected through a reversing mechanism with the main clutch whereby the character of the count registered by the counter may be selectively controlled.

Included in the drive for the counter actuator is a double integral idler 491—492 (Figure 14) suitably driven in time with the main clutch 428. The idler 491 is directly meshed with a gear 1818 journaled on a slotted shaft 1819 while the idler 492 is entrained through an idler 1820 with a second gear 1818 journaled on the shaft 1819. The gears 1818 and 1818 form a reversing mechanism, one being driven in a direction opposite that of the other and each being adapted to be selectively keyed to the shaft 1819 to drive the same in either of opposite directions.

A gear 1821, keyed on the shaft 1819, meshes with a gear 1822 fixed on a shaft 1823 which carries an eccentric 1811 (Figure 12). A lever 1830 (Figures 12 and 14) forming part of the counter actuator is journaled at its lower end on the eccentric 1811 and has an irregular slot guided over a frame pin 1836. Pivoted to the upper end of the lever 1830 is an actuator finger 1824 having a slot therein guided over a frame pin 1835. The finger 1824 has a tooth engageable with a gear 1880 entrained through an idler 1877 with a dial gear 1879 for driving an associated counter dial 1875, the latter being connected to the gear 1879 through a planetary gear arrangement not shown. The arrangement of the counter finger 1824 and the lever 1830 is such that for each cycle of operation of the main clutch the tooth of finger 1824 will engage between the teeth of the gear 1880 and advance the same an increment of one tooth pitch in one direction or another depending upon which of the driven gears 1816 and 1818 is keyed to the shaft 1819, thus advancing the associated dial one unit of registration.

For the purpose of selectively keying one or another of the gears 1816 and 1818 to the shaft 1819 a key 1812 is slidable in the longitudinal slot in shaft 1819 and has a tooth 1814 engageable in slots 1817 formed in the juxtaposed hubs of gears 1816 and 1818. The key 1812 is rotatably connected to a shaft 1810 slidable in a bearing 1811 and having a notch formed therein and embracing a cam 1808 having two spaced camming faces 1825 aligned in a single plane and a third camming face 1826 displaced in a second plane. The cam 1808 is pivoted on a pin 1809 and is connected by means of a link 1807 with a differentially settable link 1873, the link 1807 being connected to a stud 1849 located on the link 1873 midway between its ends. The lower end of this differential link 1873 is pivoted to an arm 1805 free on the shaft 976 while the upper end of the link is connected to a settable member 1803 through a connecting link 1872. The member 1803 has a portion extending through a slot in the keyboard whereby it may be selectively manipulated into either of two positions.

A spring pawl 1837 is provided for pawling the member 1803 in either of its manipulated positions and is pivoted at 1838 and urged in a clockwise direction by spring 1839. This pawl has a nose 1870 engaging a projection 1871 on the lever 1803 to retain it in either position in which it may be set.

The arm 1805 and the lower end of the link 1873 are pawled in either of two positions by a spring pawl 1742 pivoted on the frame pin 1736 and provided with a pair of spaced V-shaped notches, one of which is held in embracement with a pin 1743 on the arm 1805 by a spring 1744 tensioned between the pawl and the frame.

The character of the registration in the counting register can be controlled by the member 1803. When this member is in its rearward illustrated position the counting register will give a direct or positive count of multipliers in multiplication and of quotients in division, while when member 1803 is moved to its forward position the counter register will give a complementary or negative count of multipliers in multiplication and a complementary count of quotients in division.

In order to obtain a true figure multiplier registration or true figure item count in multiplication, additive, or subtractive operations it is necessary that the counter dials be driven in the same direction as the accumulator dials are driven, while to obtain a true figure registration of quotients in division operations it is necessary that the counter dials be driven in the opposite direction to that in which the accumulator dials are driven. This requires a reversal of the counter drive upon initiation of the division operation so that in whichever position lever 1803 stands, the interchange from the proper direction of actuation of the counter register for multiplication, etc., to the proper direction of actuation thereof for division is secured. This is accomplished by automatically shifting the pivotal connection of arm 1805 and the lower end of the link 1873 to an alternate rearward position, illustrated in Figure 13, at the start of the division calculation.

According to the present invention this is accomplished by a lever 1720 (Figures 12 and 13) secured to the shaft 976, which shaft, as shown in Figure 11 is connected to the division key 970 by member 1026 fixed to the shaft 976, link 965 pivotally connected at one end to the member 1026 and lever 973 pivotally mounted on the machine frame and pivotally connected adjacent its opposite ends to the link 965 and the stem 971 of key 970 respectively. This arrangement is such that upon depression of the key 970, shaft 976 will be rocked clockwise as viewed both in Figure 11 and in Figures 12 and 13, carrying an ear 1721 on the upper end of lever 1720 into engagement with the left edge of arm 1805 and moving the latter from the position in which it is shown in Figure 12 to the position in which it is shown in Figure 13.

Arm 1805 being releasably retained by the spring pawl 1742 which engages pin 1743 on said arm, lever 1720 may be returned to the position in which it is shown in Figure 12 without effecting any movement of arm 1805, and unless said arm is restored to the position in which it is shown in Figure 12 by the restoring mechanism hereinafter described, it will remain in the position in which it is shown in Figure 13 after the division operation has terminated and the key 970 has been restored to raised position. Under such circumstances, if the next calculation is a division operation no adjustment of arm 1805 by lever 1720 will take place, because the arm 1805 will already occupy the position in which it is shown in Figure 13.

Independently actuated means are provided for restoring the counter reversing mechanism from its division setting to its normal setting, which means is arranged to be disabled upon depression of the division key so as to avoid interference with the mechanism just described and so as to eliminate useless restoration and resetting when division operations are performed successively. According to the preferred embodiment of the invention here disclosed, this restoration is accomplished by means operated by the setting clutch which means are effective to restore the arm 1805 from the position in which it is shown in Figure 13 to the position in which it is shown in Figure 12.

For this purpose member 1722 (Figures 12 and 13) is pivotally mounted at 1723 on a link 1713 adapted to be reciprocated so as to produce a generally horizontal movement of the pivot 1723. At its lower end, the link 1713 is pivotally connected by a pin 1724 to an arm 1725 pivotally mounted on the frame of the machine at 1728, while at its upper end (see Figure 6) the link 1713 is pivotally connected to an arm 1714 fixed to shaft 600, which shaft as previously described is rocked counter-clockwise during each cycle of operation of the setting clutch and clockwise during each operation of the restore clutch. This arrangement is such that during each setting clutch cycle member 1722 is moved leftwardly as viewed in Figures 12 and 13, while during each restore clutch cycle it is moved rightwardly.

Member 1722 is provided with a spring 1726 tensioned between a tail thereof and an ear of a second pivotally mounted member 1727, hereinafter described; which spring constrains member 1722 to rock counter-clockwise about its pivot 1723 and maintain the upper fork of its bifurcate left end in engagement with the upper side of the ear 1721 of lever 1720. When lever 1720 is in the position in which it is shown in Figure 12, which is when the division key 970 is raised, member 1722 is rocked by its spring 1726 to its lowermost position, and a shoulder 1745 thereon is positioned so that upon leftward movement of member 1722, which occurs during each setting clutch cycle, said shoulder will engage a pin 1746 extending from arm 1805 and restore arm 1805 from the position in which it is shown in Figure 13 to the position in which it is shown in Figure 12.

Means are provided, which are effective whenever the division key 970 stands depressed, for disabling this restoring mechanism. The upper fork of the bifurcate left end of member 1722 extends at such an angle with respect to the path of movement of the ear 1721 of lever 1720 that clockwise movement of lever 1720 from the position in which it is shown in Figure 12 to the position in which it is shown in Figure 13 will raise member 1722 sufficiently so that the path of movement of the shoulder 1745 during leftward movement of member 1722 will be above the pin 1746, and no setting clutch cycle occurring while the division key 970 stands depressed can therefore effect restoration of the arm 1805 to the position in which it is shown in Figure 12.

In the particular machine disclosed in the aforesaid Avery patent the latch 882 (Figure 11) holding the division key 970 depressed is released concurrently with the leftward movement of member 975 (Figure 9) prior to the last setting clutch cycle in terminating a division operation. Therefore it is necessary in applying the present invention to provide a supplemental latch for the member 1720 (Figures 12 and 13) which will hold the member 1720 in the position in which it is shown in Figure 13 until the shoulder 1745 of member 1722 has passed over and beyond pin 1746 during the said last setting clutch cycle, so that the counter will not be restored from its division setting to its normal setting and thus register erroneously during the corrective addition cycle which will follow the last setting clutch cycle if the accumulator registers an overdraft. In applying the invention to a machine in which the division initiating member is not released or restored until registration has been completed, however, it will be apparent that no such supplemental latch is required.

The supplemental latch of the present disclosure comprises a latching tooth 1729 on the upper fork of member 1722, which tooth is adapted to engage the ear 1721 of lever 1720 and hold the latter in the position in which it is shown in Figure 13. The latching tooth 1729 is so positioned that when the division key 970 is held in depressed position by the latch 882 (Figure 11) the ear 1721 (Figure 13) is spaced rightwardly from the tooth 1729. Thus the release of latch 882 permits the key 970 to rise a sufficient distance to prevent reengagement of latch 882, but latching tooth 1729 arrests the accompanying counter-clockwise movement of lever 1720 so that shoulder 1745 is not lowered a sufficient distance to engage pin 1746 during the ensuing setting clutch cycle.

Means are provided for releasing the supplemental latch 1729 during the said last setting clutch cycle but only after the shoulder 1745 of member 1722 has passed above and beyond the pin 1746 during the leftward movement of said member. For this purpose member 1722 is provided with a cam face 1740 engageable with frame pin 1736 during leftward movement of the member 1722 but spaced therefrom a sufficient distance so that upward movement of member 1722 will be effected thereby to trip the latch 1729 only after the shoulder 1745 has passed above and beyond the position in which pin 1746 is shown in Figure 13.

It should be noted that the cam face 1740 is proportioned so as to raise the shoulder 1745 completely out of engagement with pin 1746 during leftward movement of member 1722 while lever 1720 occupies the position in which it is shown in Figure 12 just as pin 1746 reaches the position in which it is shown in that figure, but that even if variations within ordinary manufacturing tolerances result in the raising of shoulder 1745 out of engagement with pin 1746 slightly before the pin reaches that position under such conditions, shoulder 1745 will have moved pin 1746 at least far enough leftward so that the remainder of the leftward restoration of arm 1805 will be effected by the spring pawl 1742 the divergent notches of which engage the pin 1743 on arm 1805 and can thus serve to move it from just past an intermediate position to a fully restored position and vice versa.

This arrangement is such that after a division calculation, if the succeeding calculation is any other than a division calculation the ensuing preparatory setting clutch cycle will move the member 1722 to the left and the shoulder 1745 will engage the pin 1746 to rock the arm 1805 and lower end of the link 1873 leftward to their full line position illustrated in Figure 12, thus returning the cam 1808 to condition the counter drive to cause a direct count of the machine cycles and the centralizer 1742 will become effective to hold the counter control linkage in this position.

If the next calculation, however, is a division calculation the lever 1720 will have been rocked back to the position illustrated in Figure 13, raising the member 1722 before the ensuing setting clutch cycle becomes effective, and this will prevent the member 1722 from rocking the arm 1805 back to its normal forward setting.

It will be noted that the setting of the lever 1803 will reverse the character of the count by alternatively positioning the upper end of the link 1873. That is, when lever 1803 is set in a forward position and the arm 1805 and the lower end of the link 1873 are in their forward positions illustrated in Figure 12, the cam 1808 will normally be set in an intermediate position with the cam face 1826 engaging the notch in shaft 1810, the rightward setting of the arm 1805 incidental to depression of the division key will result in the cam being rocked counter-clockwise to engage the lower cam face 1825 in the notch in shaft 1810.

Means are provided to prevent inadvertent resetting of the lever 1803 during actuation. Located on the member 1727 which is pivotally mounted on pin 1736, is an ear 1749 which, when the machine is at rest, lies directly behind a notch 1750 in the spring pawl 1837 thereby permitting the lever 1803 to be manipulated at will. However, during a calculation of any kind in which the accumulator register is dipped for actuation, the link 1713 will be held in a leftward position and a roller 1738 on arm 1725 will permit the spring 1726 to rock the member 1727 slightly clockwise to position the ear 1749 out of line with the notch 1750 in the spring pawl 1837, thus preventing the pawl 1837 from being rocked through the full extent of its stroke during attempted movement of the lever 1803 from one setting to the other and will thus prevent such movement.

Means are also provided for preventing depression of the division key 970 after dipping of the carriage has occurred in response to the operation of any other control key. For this purpose member 1727 is provided adjacent its left end with a notch 1739 adapted to engage the right edge of the ear 1721 of lever 1720 when during the dipping of the carriage the roller 1738 moves from under cam 1737 of member 1727, provided the division key has not previously been depressed.

The interlock 1727 also serves to prevent depression of the division key after it has once been released during the second setting clutch cycle incident to termination of a division operation and before the machine has come to a complete rest. During such a second setting clutch cycle in a terminal order in division, the lever 1720 is rocked counter-clockwise as the division key rises. At the same time the roller 1738, upon moving leftwardly, permits the spring 1726 to rock the member 1727 to latch the ear 1721 in its leftmost position until the succeeding final restore cycle, at which time the link 1713 is retracted causing the roller 1738 to cam the member 1727 counter-clockwise.

*Easy division key operation*

The present invention also contemplates the provision of means whereby the pressure which must be exerted by the operator upon the division key to initiate a division operation is minimized. This is accomplished, in general, by automatically applying spring force to raise the division key at the time it is released from the last of the latching means holding it depressed, and automatically relieving such spring force at all times when manual depression of the key may take place. In a machine embodying this mechanism only sufficient spring force need be applied for normally maintaining the key in raised position, to prevent it from moving gravitationally, or under the influence of vibration, to depressed position.

Such a very light spring is indicated at 1755 (Figures 12 and 13) as effective through lever 1720, shaft 976 (see also Figure 11), member 1026, link 965, and lever 973 to normally maintain key 970 in raised position.

The means for automatically applying spring force to raise the key when it is released from the last of the latching means holding it depressed, comprises a lever 1714 (Figures 7A and 12) fixed to the shaft 600 and connected to the lever 1720 by a tension spring 1730 containing a rod 1130' which serves to limit the collapse of the spring and by a link 1731 provided with a slot 1732 guiding the link on a frame pin 1734 and connected to a pin 1735 on lever 1720 by means of a lost-motion connection in the form of a slot 1733 embracing said pin.

It will be recalled that the shaft 600 is rocked counter-clockwise from the position in which it is shown in Figure 6 during each setting clutch cycle, and clockwise back to said position during each restore clutch cycle. Thus during each setting clutch cycle, if the lever 1720 is in the position in which it is shown in Figure 13, spring 1730 will be tensioned to exert a spring force tending to rock lever 1720 counter-clockwise and raise the division key 970. Also during the same setting clutch cycle link 1713 connected to the upper end of lever 1714 is moved leftward carrying member 1722 leftward and raising it slightly by the action of cam 1740 against pin 1736 to release the ear 1721 of lever 1720 from the latching tooth 1729 as previously described.

During all of the setting clutch cycles except the last in any division operation the latch 982 (Figure 11) is effective to hold the division key depressed, but after the release of latch 982 in the manner previously described in connection with the termination of a division operation, the latch 1729 becomes effective as the last latching means holding the division key depressed. Under such circumstances it will be evident from the above description that the spring means comprising spring 1730 is under tension at the time the latch 1729 is released and that the spring force thereof is thereupon effective to raise the division key.

During the ensuing restore clutch cycle the shaft 600 is rocked back to the position in which it is shown in Figure 6 relieving the tension on spring 1730 leaving the parts described in this connection in the position in which they are shown in Figure 12, from which it is evident that due to the lost-motion connection between lever 1720 and link 1731, the division key 970 can be depressed without the slightest interference from the means employed to return it to raised position.

I claim:

1. In a motor driven calculating machine, the combination with automatic calculation control mechanism including a settable operation control member; and a reversible registering mechanism including a settable direction control member; of means controlled by said operation control member upon setting thereof for setting said direction control member, positively operable means actuated by the motor normally effective to restore said direction control member from set position, and means controlled by said operation control member to render said positively operable means ineffective upon setting of said operation control member and to cause restoration of said positively operable means to effective condition upon restoration of said operation control member from set position.

2. In a motor driven calculating machine, the combination with mechanism for conditioning said machine for a calculation, automatic calculation control mechanism including a settable operation control member; and a reversible registering mechanism including a settable direction control member; of means controlled by said operation control member upon setting thereof for setting said direction control member, means including said operation control member for controlling said conditioning mechanism; positively operable means actuated by said conditioning mechanism normally constituting an operative connection between the motor and said direction control member to restore said direction control member from set position, and means controlled by said operation control member to disable said operative connection to render said positively operable means ineffective upon setting of said operation control member and to reenable said operative connection to cause restoration of said positively operable means to effective condition upon restoration of said operation control member from set position.

3. In a motor driven calculating machine, the combination with automatic calculation control mechanism including a settable operation control member; and a reversible registering mechanism including a settable direction control member; of means controlled by said operation control member upon setting thereof for setting said direction control member, means including a member actuated by the motor through an operative path of movement to restore said direction control member from set position, and means controlled by said operation control member to guide said restoring member out of said operative path of movement upon setting of said operation control member and to cause return of said restoring member to said operative path of movement upon restoration of said operation control member from set position.

4. In a motor driven calculating machine, the combination with mechanism for conditioning said machine for a calculation, automatic calculation control mechanism including a settable operation control member; and a reversible registering mechanism including a settable direction control member; of means controlled by said operation control member upon setting thereof for setting said direction control member, means including said operation control member for controlling said conditioning mechanism; means including a member actuated by said conditioning mechanism through an operative path of movement to restore said direction control member from set position, and means controlled by said operation control member to guide said restoring member out of said operative path of movement upon setting of said operation control member and to cause return of said restoring member to said operative path of movement upon restoration of said operation control member from set position.

5. In a motor driven calculating machine, the combination with automatic calculation mechanism including a settable operation control member; means for holding said operation control member in set position, and a reversible registering mechanism including a settable direction control member; of means controlled by said operation control member upon setting thereof for setting said direction control member, positively operable means actuated by the motor for forming an operative connection between the motor and said direction control member whereby to restore said direction control member from set position, means controlled by said operation control member upon setting thereof for rendering said positively operable means ineffective, means operable as an incident to termination of operation of the machine for releasing said operation control member from said holding means and restoring the same from set position, and means controlled by said operation control member upon restoration thereof from set position for restoring said positively operable means to effective condition.

6. In a motor driven calculating machine, the combination with automatic calculation mechanism including a settable operation control member; means for holding said operation control member in set position, and a reversible registering mechanism including a settable direction control member; of means controlled by said operation control member upon setting thereof for setting said direction control member, means including a member actuated by the motor through an operative path of movement to restore said direction control member from set position, and means controlled by said operation control member to guide said restoring member out of said operative path of movement upon setting of said operation control member and to cause return of said restoring member to said operative path of movement upon restoration of said operation control member from set position, and means operable as an incident to termination of operation of the machine for releasing said operation control member from said holding means and restoring the same from set position.

7. In a motor driven calculating machine, the combination with mechanism for conditioning said machine for a calculation, automatic calculation mechanism including a settable operation control member; means for holding said operation control member in set position, and a reversible registering mechanism including a settable direction control member; of means controlled by said operation control member upon setting thereof for setting said direction control member, means including said operation control member for controlling said conditioning mechanism; positively operable means actuated by said conditioning mechanism for forming an operative connection between the motor and said direction control member whereby to restore said direction control member from set position, means controlled by said operation control member upon setting thereof for rendering said positively operable means ineffective, means operable as an incident to termination of operation of the machine for releasing said operation control member from said holding means, and means controlled by said operation control member upon restoration thereof from set position for restoring said positively operable means to effective condition.

8. In a motor driven calculating machine, the combination with mechanism for conditioning said machine for a calculation, automatic calculation mechanism including a settable operation control member; means for holding said operation control member in set position, and a reversible registering mechanism including a settable direction control member; of means controlled by said operation control member upon setting thereof for setting said direction control member, means including said operation control member for controlling said conditioning mechanism; means including a member actuated by said conditioning mechanism through an operative path of movement to restore said direction control member from set position, means controlled by said operation control member to guide said restoring member out of said operative path of movement upon setting of said operation control member and to cause return of said restoring member to said operative path of movement upon restoration of said operation control member from set position, and means operable as an incident to termination of operation of the machine for releasing said operation control member from said holding means and restoring the same from set position.

ROBERT E. BOYDEN.